United States Patent
Stoutenburg et al.

(10) Patent No.: US 8,355,960 B2
(45) Date of Patent: *Jan. 15, 2013

(54) ELECTRONIC ACKNOWLEDGEMENT OF RECEIPT OF INVENTORY

(75) Inventors: Earney E. Stoutenburg, Parker, CO (US); David R. Baumgartner, Parker, CO (US); Theresa L. Anuszewski, Franktown, CO (US); Ross G. Kinney, Aurora, CO (US); David A. Owen, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 1580 days.

This patent is subject to a terminal disclaimer.

(21) Appl. No.: 11/086,934

(22) Filed: Mar. 22, 2005

(65) Prior Publication Data

US 2005/0187835 A1    Aug. 25, 2005

Related U.S. Application Data

(62) Division of application No. 09/965,083, filed on Sep. 26, 2001.

(51) Int. Cl.
*G06Q 10/00* (2006.01)
*G06Q 40/00* (2006.01)

(52) U.S. Cl. .......................... 705/28; 705/35

(58) Field of Classification Search .............. None
See application file for complete search history.

(56) References Cited

U.S. PATENT DOCUMENTS

| | | | |
|---|---|---|---|
| 4,972,318 A | 11/1990 | Brown et al. | |
| 5,638,283 A | 6/1997 | Herbert | |
| 5,647,677 A * | 7/1997 | Smith | 400/70 |
| 5,667,315 A * | 9/1997 | Smith | 400/78 |
| H1743 H | 8/1998 | Graves et al. | |
| 6,134,561 A | 10/2000 | Brandien et al. | |
| 7,054,844 B2 * | 5/2006 | Fletcher et al. | 705/75 |
| 7,131,585 B2 * | 11/2006 | Gyi et al. | 235/385 |
| 2002/0091603 A1 * | 7/2002 | Steiger et al. | 705/35 |
| 2002/0104026 A1 | 8/2002 | Barra et al. | |
| 2003/0195811 A1 * | 10/2003 | Hayes et al. | 705/26 |

FOREIGN PATENT DOCUMENTS

CA    2313039    2/1999

OTHER PUBLICATIONS

Plug & play: electronics distributor overhauls supply chain to improve delivery and boost sales; Materials Management and Distribution. Toronto: Nov. 1996. vol. 41, Issue 11 (3 pgs.).

(Continued)

*Primary Examiner* — Paul Danneman
(74) *Attorney, Agent, or Firm* — Sutherland Asbill & Brennan LLP

(57) ABSTRACT

A method for tracking status of an inventory shipment sent to a recipient includes monitoring whether the recipient has transmitted an electronic acknowledgment of the status of the shipment; and automatically transmitting a message to the recipient requesting acknowledgment of receipt of inventory if the electronic acknowledgment is not transmitted by the recipient within a first predetermined amount of time.

22 Claims, 2 Drawing Sheets

OTHER PUBLICATIONS

Business Editors & High Tech Writers. 1SAP and Federal Express Launch Integrated Solution to Extend Global Supply-Chain Capabilities to R/3 Users. Business Wire. New York: Apr. 8, 1998. (5 pgs.).
Steltzer, Theresa M., "Warehousing: Demco Express." Chilton's Distribution. Radnor: Sep. 1989. vol. 88, Issue 9. (3 pgs.).
International Search Report for PCT/US0228969 dated Feb. 11, 2004. (5 pgs.).
Examiner's Report for Canadian Application No. 2,461,615 dated Feb. 26, 2010 (5 pgs.).
Notice of Allowance for U.S. Appl. No. 09/965,083 (8 pgs.).

* cited by examiner

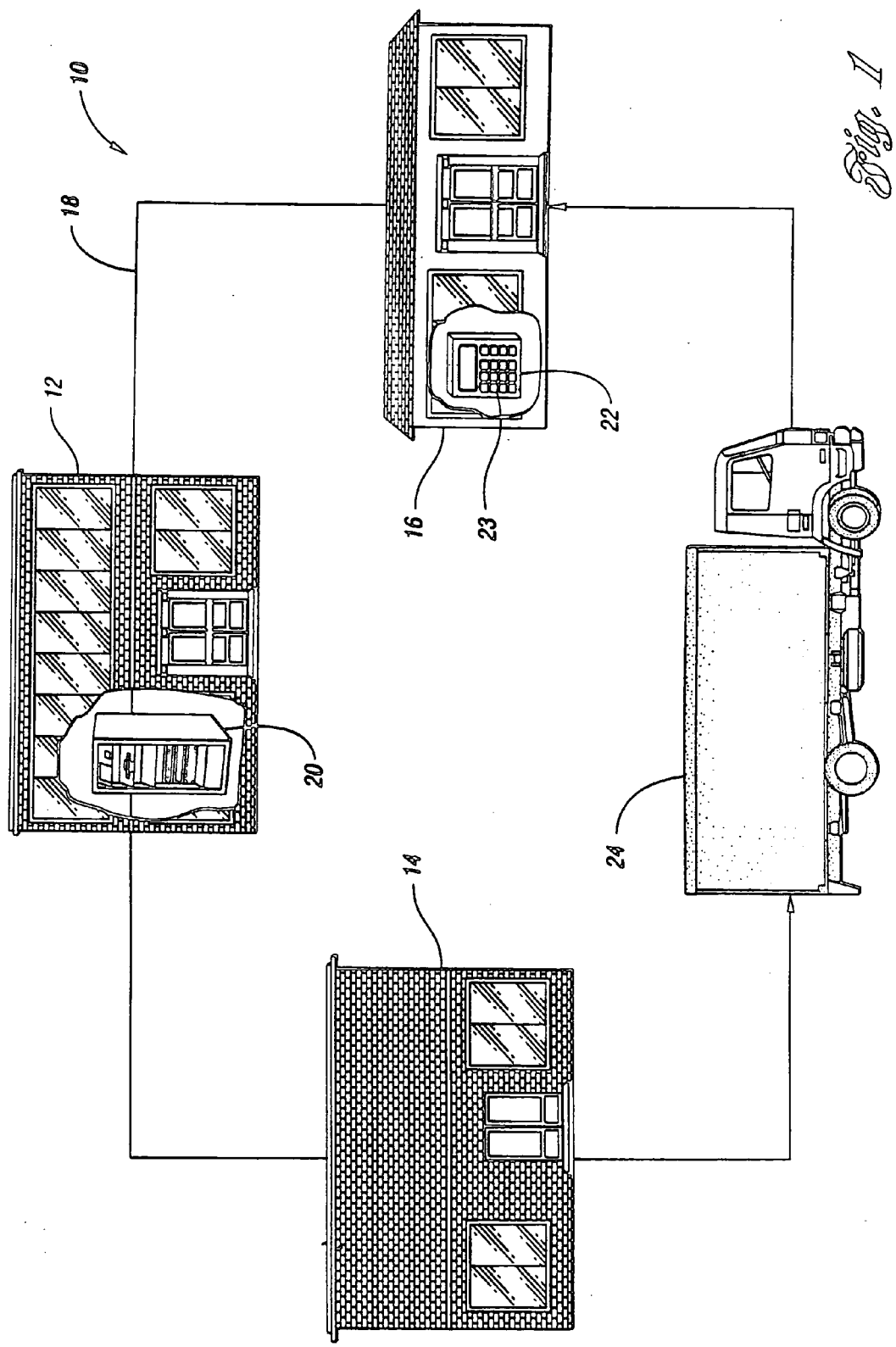

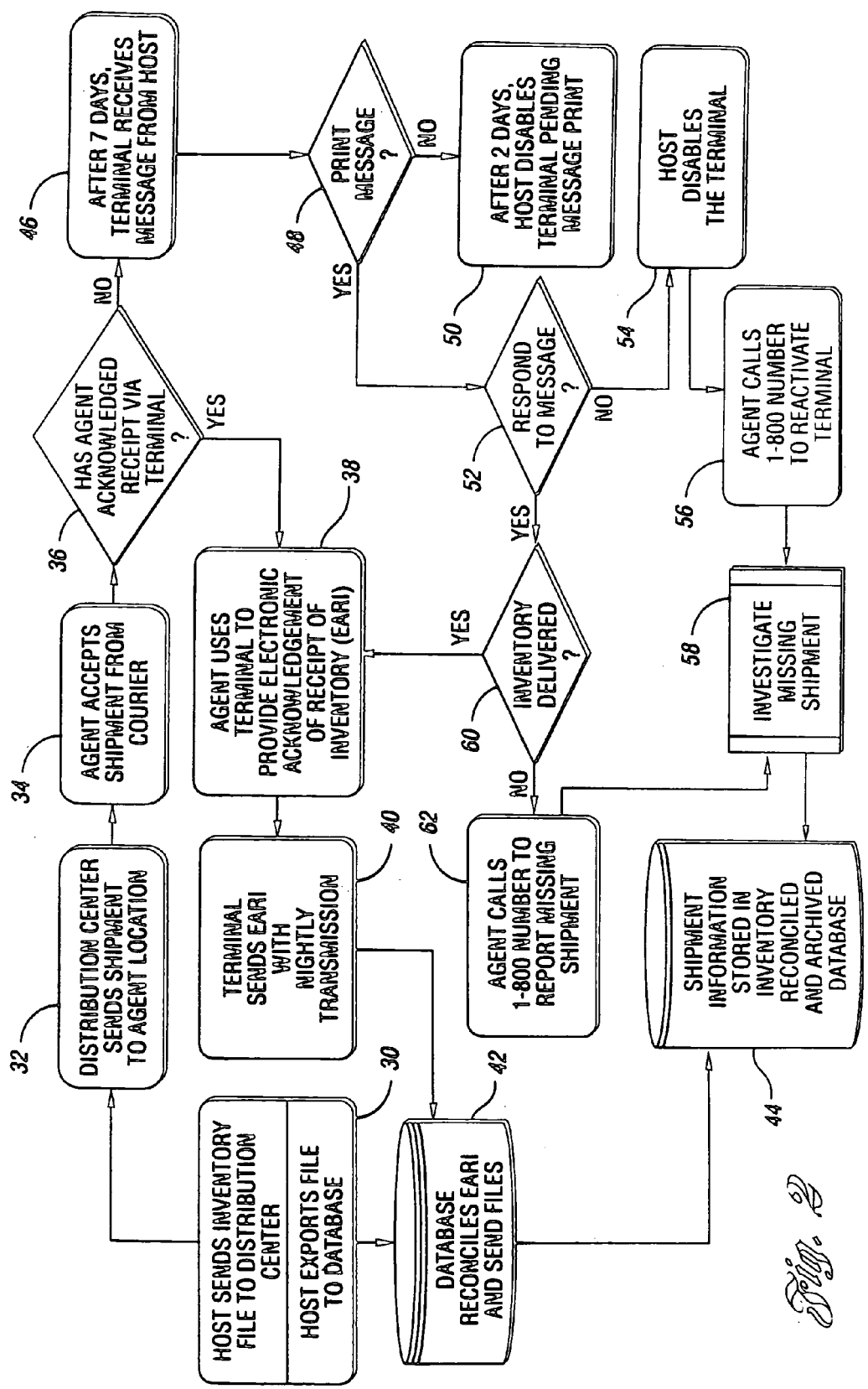

ELECTRONIC ACKNOWLEDGEMENT OF RECEIPT OF INVENTORY

TECHNICAL FIELD

This is a divisional of copending application(s) Ser. No. 09/965,083 filed on Sep. 26, 2001.

The present invention relates to the distribution of and tracking of inventory used for providing financial services.

BACKGROUND ART

A financial services firm may have a host computer in communication with a plurality of terminals that are distributed over a large area (e.g., nationwide). Such terminals are typically operated by agents so as to provide financial services to customers, such as money transfer transactions and preparation of negotiable instruments. The financial services firm may also send preprinted financial documents to the agents for use in preparing negotiable instruments requested by customers.

A problem associated with sending preprinted financial documents to an agent is that the financial services firm may not know whether the agent has received the documents. The financial documents could become lost, they could get into the wrong hands, or the agent could simply forget to inform the financial services firm that a particular shipment has been received. Obviously, many collateral problems may result from not knowing the whereabouts of a particular financial document shipment. If the shipment ends up in the wrong hands, for example, fraudulent money orders may be created, which could result in large financial losses for the financial services firm.

One solution for addressing the above-identified problem involves requesting the agent to sign and remit a confirmation receipt, such as a post-card, for the financial document shipment. While this solution is effective in most cases, it does not provide the financial services firm sufficient control over the agents to ensure timely remittance of an acknowledgment of receipt of inventory. Consequently, many shipments are sent to agents without confirmation that the shipments were actually received.

Therefore, there exists a need for a new and improved method and system for tracking status of inventory shipments, and for acknowledging receipt of such shipments at remote agent locations.

DISCLOSURE OF INVENTION

The present invention addresses the shortcomings of the prior art by providing a method and system for electronically communicating status of an inventory shipment sent by a sender to a recipient. The present invention further provides the sender the capability of encouraging the recipient to acknowledge receipt of the inventory.

Under the invention, a method for tracking status of an inventory shipment sent to a recipient includes monitoring whether the recipient has transmitted an electronic acknowledgment of the status of the shipment; and automatically transmitting a message to the recipient requesting acknowledgment of receipt of inventory if the electronic acknowledgment is not transmitted by the recipient within a first predetermined amount of time.

The monitoring step may include monitoring whether the recipient has transmitted, via a terminal, the electronic acknowledgment to a host computer in communication with the terminal. The method may also include inhibiting operation of the terminal if the recipient does not print the message within a second, predetermined amount of time. Furthermore, the method may include restoring operation of the terminal after the recipient prints the message.

Alternatively or supplementally, the method may include inhibiting operation of the terminal if the recipient does not respond to the message within a second, predetermined amount of time. In addition, the method may include restoring operation of the terminal after the recipient responds to the message.

Because the method may include inhibiting operation of a terminal disposed at the recipient's location, the method provides a sender of the inventory shipment the ability to encourage the recipient to acknowledge receipt of the inventory shipment.

Further under the invention, a method for tracking an inventory shipment sent to a recipient includes providing the recipient with a means to electronically communicate a status of the inventory shipment to a sender of the inventory shipment. Preferably, the providing step includes providing the recipient with a terminal for electronically communicating the status of the inventory shipment. Furthermore, the method may include inhibiting operation of the terminal if the recipient does not communicate the status of the inventory shipment within a predetermined amount of time.

A system for tracking status of an inventory shipment sent to a recipient is also provided. The system includes a host computer for receiving an electronic acknowledgment of receipt of inventory from the recipient. The host computer is operable to automatically transmit a message to the recipient requesting acknowledgment of receipt of inventory if the electronic acknowledgment is not received within a first predetermined amount of time.

The system may also include a terminal in communication with the host computer, wherein the terminal is operable to transmit the electronic acknowledgment to the host computer and to receive the message from the host computer.

These and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a block diagram illustrating a system according to the present invention for sending an inventory shipment to an agent location, and for confirming receipt of the inventory shipment; and FIG. 2 is a flow chart illustrating operation of a method according to the invention for tracking status of an inventory shipment sent to the agent location.

BEST MODE FOR CARRYING OUT THE INVENTION

With reference to FIG. 1, a system 10 is shown for transporting inventory from a sender, such as financial services firm 12, to a recipient, such as an agent location 16. The financial services firm 12 is in communication with a distribution center 14 and the agent location 16 via one or more communication networks, such as communication network 18. Communication network 18 may be any suitable network such as a local area network, a wide area network, a dial-up network, the Internet, a wireless network or any combination thereof. Technologies such as high speed fiber optics, coaxial cable and/or twisted copper pair cabling may be used to create the communication network 18.

The financial services firm 12 has a host computer 20 for managing inventory. Such inventory may include, for example, supplies, printer ribbons, signage, transaction forms, and/or negotiable instrument forms that are processed by an agent at agent location 16 to create negotiable instruments, such as money orders, gift certificates or vendor payments. Further, host computer 20 is configured to send data over communication network 18 to distribution center 14 so as to request certain tasks of the distribution center 14. For example, host computer 20 may send a request to distribution center 14 to send an inventory shipment to agent location 16, as explained below in greater detail.

Typically, the distribution center 14 is a warehouse facility for handling and storing inventory used in the financial services business. The distribution center 14 may be owned and/or operated by the financial services firm 12, or it may be an independent entity. Generally, the distribution center 14 may engage a courier service 24, such as Federal Express® or United Parcel Service®, to transport inventory to the agent location 16.

Agent location 16 includes a terminal 22, which may be provided and/or owned by the financial services firm 12, and is configured to communicate with host computer 20 via communication network 18. Furthermore, terminal 22 is preferably, but not necessarily, configured to process sale transactions and/or to print negotiable instruments. In one embodiment of the invention, terminal 22 is a point of sale terminal, such as an FDX-400® device available from First Data Corporation of Englewood, Colo. Alternatively, terminal 22 may be any suitable device that is configured to communicate with the host computer 20, such as a personal digital assistant device (PDA), personal computer (PC), or automated teller machine (ATM). The terminal 22 may also include a web browser and/or other Internet software/hardware, so as to communicate with host computer 20 via the Internet.

Terminal 22 is configured to receive input from the agent through a keypad 23. Alternatively or supplementally, the terminal 22 may include any suitable device for receiving input, such as a bar code scanner, MICR scanner, OCR scanner, voice recognition or response unit, or third party interface. Additionally, terminal 22 has a display screen for displaying information generated by or input into the terminal 22, and/or generated by the host computer 20. Preferably, terminal 22 also includes a printer (not shown) for printing messages, financial documents such as negotiable instruments, and the like.

As explained above, host computer 20 and terminal 22 are configured to communicate with each other via communication network 18. For example, one message that may be sent to the host computer 20 from terminal 22 is an acknowledgment of receipt of a shipment of inventory. An example of a message that may be sent from host computer 20 to terminal 22 is an instruction to insert paper into the printer in order to print a message from the host computer 20. This allows a long message to be communicated to the agent that would be impractical to display on the display screen of terminal 22. The host computer 20 may also be operative to monitor the terminal 22 to determine whether or not messages sent by the host computer 20 have been printed by the terminal 22.

Referring now to FIG. 2, operation of a method for tracking status of inventory shipped by financial services firm 12 to agent location 16 is illustrated, in accordance with the present invention. First, the financial services firm 12 initiates an inventory shipment to agent location 16. For example, host computer 20 may be used to send an inventory file to the distribution center 14 via communication network 18, as indicated at block 30. The inventory file contains an itemized list of all of the items or inventory the financial service firm 12 desires to be shipped to the agent location 16. Such items may include, for example, negotiable instrument forms, supplies, printer ribbons, signage, transaction forms, etc. The inventory file may also contain other information such as shipment number and a desired shipment date. Alternatively, the shipment may be initiated in any suitable manner.

As further indicated at block 30, the host computer 20 may also send a copy of the inventory file to a receipt confirmation database. The receipt confirmation database may be part of the host computer 20, or it may be a separate database that is accessible through the host computer 20.

The distribution center 14 receives the inventory file from the host computer 20, and ships the inventory via courier 24, as represented by block 32. The financial services firm 12 may also send a message or notice to the terminal 22, via the host computer 20, indicating that the shipment has been sent. At block 34, an agent at agent location 16 accepts the shipment from the courier 24.

At block 36, the host computer 20 reviews the receipt confirmation database to determine whether the agent has acknowledged receipt of the inventory via terminal 22. The agent may acknowledge receipt of the inventory by using terminal 22 to send an electronic acknowledgment of receipt of inventory (EARI) to the receipt confirmation database, as indicated by blocks 38, 40 and 42. The EARI is a message that preferably contains identifying information corresponding to the shipment, such as shipment number, shipment date and/or a list of inventory received.

Next, the receipt confirmation database reconciles or otherwise compares the EARI with the inventory file sent by host computer 20, as indicated at block 42. If the EARI corresponds with the inventory file sent by host computer 20, the shipment is marked received and is stored in an inventory reconciled and archived database, as represented by block 44. The inventory reconciled and archived database may be part of the host computer 20, or it may be a separate database that is accessible through the host computer 20.

However, if the agent does not acknowledge receipt of the shipment using terminal 22, the host computer 20 automatically sends a request for acknowledgment of receipt of inventory notification or message to the terminal 22 after a predetermined, configurable amount of time, such as seven days from shipment of the inventory, as represented by block 46. If the message is not printed by terminal 22 within a predetermined amount of time, such as two days after the terminal 22 has received the message, then the host computer 20 may inhibit operation of the terminal 22 or completely disable the terminal 22, until the message is printed, as represented by blocks 48 and 50. For example, the host computer 20 may send a disable code or command to the terminal 22, which causes the terminal 22 to become partially or fully disabled. As a result, the terminal 22 may be rendered inaccessible to the agent for transacting business or otherwise performing tasks, such as processing sales transactions, processing voids, printing documents, etc. Preferably, however, the terminal 22 retains the ability to print the message. If the terminal 22 later prints the message, then the host computer 20 may automatically restore full operation of the terminal 22, such as by sending a suitable code or command to the terminal 22.

Alternatively or supplementally, the terminal 22 may be programmed or otherwise configured to automatically inhibit operation of itself, or completely disable itself, if the terminal 22 is not directed or otherwise instructed by the recipient to print the message within a predetermined amount of time, such as two days after the terminal 22 has received the message. For example, the terminal 22 may include an internal tracking system that tracks message print status upon receipt of the message. If the message is not printed by the terminal 22 within the predetermined amount of time, the tracking system may cause the terminal 22 to become partially or fully disabled. Again, however, the terminal 22 preferably retains the ability to print the message. If the terminal 22 is then instructed to print the message, the tracking system may automatically restore full operation of the terminal 22.

After the message has been printed, the host computer 20 then determines whether the agent has responded to the message, as indicated at block 52. If the agent does not respond to the message within a predetermined amount of time, such as one day after printing the message, the host computer 20 may automatically inhibit operation of terminal 22, or completely disable terminal 22, as represented by block 54. At block 56, the agent may then be required to call the financial services firm 12 to reactivate the terminal 22, or otherwise restore operation of terminal 22 through host computer 20. For example, the host computer 20 may cause the terminal 22 to display a message directing the agent to call the financial services firm.

Alternatively or supplementally, the host computer 20 may automatically list the shipment or any items of the shipment, such as negotiable instrument forms, in a "watch list." If any of such negotiable instrument forms are later prepared as negotiable instruments and presented for settlement through the host computer 20, the host computer 20 may automatically flag the shipment or any portion of the shipment for investigation.

Next, the financial services firm 12 investigates the missing shipment as indicated at block 58. After determining the whereabouts of the shipment, the financial services firm 12 may then update the inventory reconciled and archived database at block 44, and reactivate the terminal 22, if appropriate to do so.

Alternatively, if the agent does respond to the message and provides an EARI using the terminal 22, the process will continue as previously described, as represented by blocks 52, 60 and 38. The shipment will also be marked as received by the host computer 20, and will be stored in the inventory reconciled and archived database, as represented by block 44.

The agent may also use terminal 22 to acknowledge that the shipment has not been received. This would typically be accomplished through a series of key strokes using keypad 23. However, if the agent has printed the message but believes that the shipment was not received, the agent may then be required to call the financial services firm 12, as represented by block 62. Furthermore, the host computer 20 may automatically flag the shipment or a portion of the shipment as missing if the agent does not respond to the message. The financial services firm 12 then performs an investigation to determine the whereabouts of the shipment, as represented by block 58. Once the investigation is concluded, information regarding the shipment is stored in the inventory reconciled and archived database, as represented by block 44.

If the shipment or any portion of the shipment has not been acknowledged as received, but the terminal 22 or other device at the agent location 16 transmits a sale on an item included in the shipment or portion of the shipment, then the host computer 20 may automatically mark the shipment or portion of the shipment as received in the inventory reconciled and archived database.

Because the status of inventory shipments can be tracked and acknowledged electronically, the method and system of the invention are more efficient and accurate than prior methods and systems. Furthermore, because the host computer 20 and/or terminal 22 may automatically inhibit operation of the terminal 22 if proper steps are not followed, the financial services firm 12 can encourage the agent location 16 to acknowledge receipt of inventory shipments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for tracking status of an inventory shipment sent to a recipient, the method comprising:
   monitoring whether the recipient has transmitted, via a point of sale transaction terminal configured to print financial documents and respond to a status of shipment request sent to the point of sale transaction terminal, an electronic acknowledgment of the status of the shipment to a host computer in communication with the point of sale transaction terminal;
   automatically transmitting a message to the point of sale transaction terminal of the recipient requesting acknowledgment of receipt of inventory if the electronic acknowledgment is not transmitted by the point of sale transaction terminal of the recipient within a first predetermined amount of time, and
   at least partially disabling operation of the point of sale transaction terminal if the point of sale transaction terminal does not print the message or the recipient does not respond to the message within a second, predetermined amount of time,
   wherein the prior operations are performed by at least one host computer, and
   wherein during a period when the point of sale transaction terminal is at least partially disabled, the point of sale transaction terminal remains capable of receiving another message from the at least one host computer.

2. The method of claim 1 further comprising restoring operation of the terminal after the recipient causes the message to be printed by the terminal.

3. The method of claim 1 further comprising restoring operation of the terminal after the recipient responds to the message.

4. The method of claim 1 further comprising transmitting a notice to the terminal indicating that the shipment has been sent.

5. The method of claim 1 wherein the terminal is disposed at a first location, and the host computer is disposed at a second location different than the first location, and wherein the host computer is configured to automatically transmit the message to the terminal requesting acknowledgment of receipt of inventory.

6. The method of claim 5 wherein the terminal is configured to print negotiable instruments.

7. The method of claim 5 wherein the terminal is configured to process sale transactions.

8. The method of claim 5 wherein the inventory shipment includes negotiable instrument forms, and wherein the method further comprises initiating the inventory shipment using the host computer.

9. The method of claim 5 wherein the terminal includes a tracking system that tracks message print status, and the tracking system is configured to at least partially disable operation of the terminal if the terminal does not print the message within a second, predetermined amount of time.

10. The method of claim 1, wherein the inventory shipment comprises negotiable instruments and wherein the host computer tracks the negotiable instruments shipped in inventories that are not received by the recipient and generates a signal that automatically flags or marks one or more of the negotiable instruments if the one or more negotiable instruments are presented for settlement.

11. A method for tracking status of an inventory shipment sent to a recipient, the method comprising:

monitoring whether the recipient has transmitted, via a point of sale transaction terminal configured to print financial documents and respond to a status of shipment request sent to the point of sale transaction terminal, an electronic acknowledgment of the status of the shipment to a host computer in communication with the point of sale transaction terminal;

automatically transmitting a message from the host computer to the point of sale transaction terminal requesting acknowledgment of receipt of inventory if the recipient does not transmit the electronic acknowledgment within a first predetermined amount of time;

at least partially disabling operation of the point of sale transaction terminal through the host computer if the point of sale transaction terminal does not print the message within a second, predetermined amount of time;

wherein during a period when the point of sale transaction terminal is at least partially disabled, the point of sale transaction terminal remains capable of receiving another message from the host computer, automatically restoring operation of the point of sale transaction terminal after the point of sale transaction terminal prints the message if operation of the point of sale transaction terminal has previously been at least partially disabled for failure to print the message; and automatically disabling the point of sale transaction terminal through the host computer if the recipient does not respond to the message within a third, predetermined amount of time.

12. The method of claim 11 wherein the terminal is disposed at a first location, and the host computer is disposed at a second location different than the first location.

13. The method of claim 12 wherein the terminal is configured to print negotiable instruments.

14. The method of claim 12 wherein the terminal is configured to process sale transactions.

15. The method of claim 11, wherein the inventory shipment comprises negotiable instruments and wherein the host computer tracks negotiable instruments shipped in inventories that are not received by the recipient and generates a signal that automatically flags or marks one or more of the negotiable instruments if the one or more negotiable instruments are presented for settlement.

16. A method for tracking an inventory shipment sent to a recipient, the inventory shipment including negotiable instrument forms, the method comprising:

providing the recipient with a point of sale transaction terminal configured to print financial documents and to electronically respond to a status request of the inventory shipment sent to the point of sale transaction terminal by a sender of the inventory shipment;

monitoring whether the recipient has communicated the status of the inventory shipment, and automatically transmitting a message to the point of sale transaction terminal requesting acknowledgment of receipt of inventory if the recipient does not transmit an electronic acknowledgment of receipt of inventory within first a predetermined amount of time; and at least partially disabling operation of the point of sale transaction terminal if the recipient does not communicate the status of the inventory shipment within a second predetermined amount of time, wherein during a period when the point of sale transaction terminal is at least partially disabled, the point of sale transaction terminal remains capable of receiving another message from at least one host computer.

17. The method of claim 16 further comprising restoring operation of the terminal after the status of the inventory shipment has been communicated to the sender.

18. The method of claim 16, wherein the inventory shipment comprises negotiable instruments and wherein the host computer tracks negotiable instrument forms shipped in inventories that are not received by the recipient and generates a signal that automatically flags or marks one or more of the negotiable instrument forms if the one or more negotiable instrument forms are presented for settlement.

19. A method for tracking an inventory shipment sent to a recipient, the inventory shipment including negotiable instrument forms, the method comprising:

providing the recipient with a point of sale transaction terminal to electronically communicate a status of the inventory shipment to a sender of the inventory shipment, wherein the point of sale transaction terminal is configured to print financial documents and respond to a status of inventory shipment request sent to the point of sale transaction terminal;

transmitting a notice to the recipient indicating that the shipment has been sent; and at least partially disabling operation of the point of sale transaction terminal if the recipient does not communicate the status of the inventory shipment within a predetermined amount of time, wherein during a period when the point of sale transaction terminal is at least partially disabled, the point of sale transaction terminal remains capable of receiving another message from at least one host computer.

20. The method of claim 19, further comprising restoring operation of the terminal after the status of the inventory shipment has been communicated to the sender.

21. A system for tracking status of an inventory shipment sent to a recipient, the system comprising:

a host computer for receiving an electronic acknowledgement of receipt of inventory from the recipient, the host computer being configured to automatically transmit a message to the recipient requesting acknowledgement of receipt of inventory if the electronic acknowledgement is not received within a first predetermined amount of time;

a point of sale transaction terminal in communication with the host computer, the point of sale transaction terminal being configured to transmit the electronic acknowledgement to the host computer;

wherein the point of sale transaction terminal is configured to receive the message from the host computer, and then inhibit operation of the point of sale transaction terminal if the point of sale transaction terminal does not print the message or send a response to the message within a second, predetermined amount of time.

22. The system of claim 21 the host computer is configured to restore operation of the terminal after the message is printed by the terminal or a response is sent to the message.

* * * * *